US012561721B1

(12) United States Patent

Null et al.

(10) Patent No.: US 12,561,721 B1
(45) Date of Patent: Feb. 24, 2026

(54) FEEDBACK ATTRIBUTION

(71) Applicant: Reputation.com, Inc., Redwood City, CA (US)

(72) Inventors: Bradley William Null, Millbrae, CA (US); Pranav Desai, San Mateo, CA (US); Hsin-wei Tsao, Menlo Park, CA (US); Hao Xu, Newark, CA (US); Dean Mao, San Francisco, CA (US)

(73) Assignee: Reputation.com, Inc., San Ramon, CA (US)

( * ) Notice: Subject to any disclaimer, the term of this patent is extended or adjusted under 35 U.S.C. 154(b) by 0 days.

(21) Appl. No.: 17/167,327

(22) Filed: Feb. 4, 2021

(51) Int. Cl.
*G06Q 30/0282* (2023.01)
*G06N 20/00* (2019.01)
*G06Q 30/0201* (2023.01)

(52) U.S. Cl.
CPC ......... *G06Q 30/0282* (2013.01); *G06N 20/00* (2019.01); *G06Q 30/0201* (2013.01)

(58) Field of Classification Search
None
See application file for complete search history.

(56) References Cited

U.S. PATENT DOCUMENTS

| | | | |
|---|---|---|---|
| 8,311,863 | B1 | 11/2012 | Kemp |
| 8,407,110 | B1 | 3/2013 | Joseph |
| 10,395,659 | B2 | 8/2019 | Piercy |
| 2002/0120554 | A1 | 8/2002 | Vega |
| 2008/0119131 | A1 | 5/2008 | Rao |
| 2008/0301009 | A1 | 12/2008 | Plaster |

| | | | | |
|---|---|---|---|---|
| 2010/0169315 | A1* | 7/2010 | Green | G06Q 10/00 |
| | | | | 707/E17.014 |
| 2013/0035975 | A1 | 2/2013 | Cavander | |
| 2014/0040748 | A1 | 2/2014 | Lemay | |
| 2014/0114876 | A1 | 4/2014 | Montano | |
| 2014/0222928 | A1* | 8/2014 | Scholtes | H04L 51/046 |
| | | | | 709/206 |
| 2014/0278769 | A1 | 9/2014 | Mccandless | |
| 2015/0039521 | A1* | 2/2015 | Schubert | G06Q 30/016 |
| | | | | 705/304 |
| 2015/0149315 | A1 | 5/2015 | Tischer | |
| 2016/0180365 | A1 | 6/2016 | Shi | |

(Continued)

FOREIGN PATENT DOCUMENTS

WO      2019143445      7/2019

OTHER PUBLICATIONS

Rosen-Zvi, M, Griffiths, T, Steyvers, M, Smyth, P, "The Author-Topic Model for Authors and Documents", Jul. 2012,[online] pp. 1-2, retrieved from the internet: https://arxiv.org/abs/1207.4169 (Year: 2012).*

(Continued)

*Primary Examiner* — Lynda Jasmin
*Assistant Examiner* — Ehrin L Pratt
(74) *Attorney, Agent, or Firm* — Van Pelt, Yi & James LLP

(57) ABSTRACT

Feedback attribution includes receiving a feedback item pertaining to an entity. It further includes receiving information pertaining to a plurality of candidate sources of the feedback item. It further includes determining a probabilistic mapping between the feedback item and the plurality of candidate sources. Determining the probabilistic mapping comprises determining, for each candidate source in the plurality of individuals, a likelihood that the feedback is attributed to a given candidate source.

15 Claims, 4 Drawing Sheets

400

(56)     References Cited

U.S. PATENT DOCUMENTS

| | | | |
|---|---|---|---|
| 2017/0134464 | A1 | 5/2017 | Rao |
| 2017/0220943 | A1 | 8/2017 | Duncan |
| 2019/0122257 | A1* | 4/2019 | Cai .................... G06Q 30/0244 |
| 2019/0197456 | A1 | 6/2019 | Perumal |
| 2020/0272975 | A1 | 8/2020 | Dumois |
| 2020/0357030 | A1* | 11/2020 | Wagner ..................... G06F 9/54 |
| 2021/0056600 | A1 | 2/2021 | Stretch |
| 2022/0122134 | A1 | 4/2022 | Hoffman |

OTHER PUBLICATIONS

C. C. Wang, M. Y. Day and Y. R. Lin, "A Real Case Analytics on Social Network of Opinion Spammers," 2016 IEEE 17th International Conference on Information Reuse and Integration (IRI), Pittsburgh, PA, USA, 2016, pp. 623-630, doi: 10.1109/IRI.2016.89 (Year: 2016).*

Bone et al., Mere Measurement "Plus": How Solicitation of Open-Ended Positive Feedback Influences Customer Purchase Behavior, Dec. 2016, American Marketing Association Journal of Marketing Research, pp. 1-44.

Palshikar et al., HiSPEED: A System for Mining Performance Appraisal Data and Text, 2017 International Conference on Data Science and Advanced Analytics, 2017, pp. 477-486.

Wang et al., A Real Case Analytics on Social Network of Opinion Spammers, 2016 IEEE 17th International Conference on Information Reuse and Integration, Dec. 15, 2016, pp. 623-630.

Author Unknown, Total Portfolio Performance Attribution Methodology, Morningstar Methodology Paper, May 31, 2013, 38 pages.

\* cited by examiner

Figure 3:
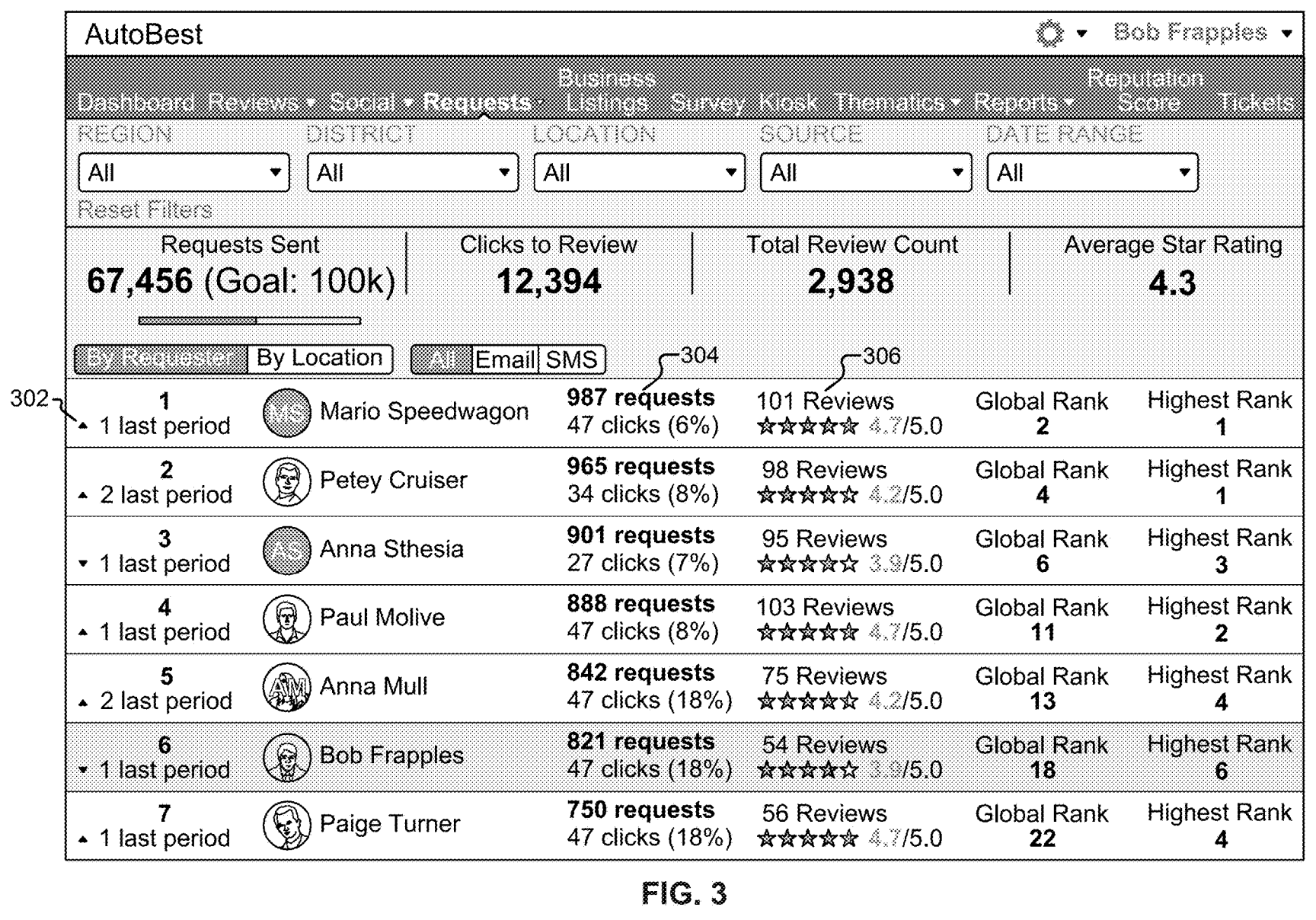

AutoBest                                                    ☼ ▸ Bob Frapples ▸

Dashboard  Reviews  Social  Requests  Business Listings  Survey  Next Thematics  Reports  Reputation Score  Tickets Reset Filters

| REGION | DISTRICT | LOCATION | SOURCE | DATE RANGE |
|--------|----------|----------|--------|-----------|
| All ▸ | All ▸ | All ▸ | All ▸ | All ▸ |

| Requests Sent | Clicks to Review | Total Review Count | Average Star Rating |
|---------------|------------------|--------------------|--------------------|
| 67,456 (Goal: 100k) | 12,394 | 2,938 | 4.3 |

By Rating | By Location    All Email SMS ⟵304    ⟵306

| | | | | | | |
|---|---|---|---|---|---|---|
| 1<br>◂ 1 last period | ⬤ Mario Speedwagon | 987 requests<br>47 clicks (6%) | 101 Reviews<br>★★★★★ 4.7/5.0 | Global Rank<br>2 | Highest Rank<br>1 |
| 2<br>◂ 2 last period | ☻ Petey Cruiser | 965 requests<br>34 clicks (8%) | 98 Reviews<br>★★★★★ 4.2/5.0 | Global Rank<br>4 | Highest Rank<br>1 |
| 3<br>▸ 1 last period | ⬤ Anna Sthesia | 901 requests<br>27 clicks (7%) | 95 Reviews<br>★★★★☆ 3.9/5.0 | Global Rank<br>6 | Highest Rank<br>3 |
| 4<br>◂ 1 last period | ☻ Paul Molive | 888 requests<br>47 clicks (8%) | 103 Reviews<br>★★★★★ 4.7/5.0 | Global Rank<br>11 | Highest Rank<br>2 |
| 5<br>◂ 2 last period | ☻ Anna Mull | 842 requests<br>47 clicks (18%) | 75 Reviews<br>★★★★★ 4.2/5.0 | Global Rank<br>13 | Highest Rank<br>4 |
| 6<br>▾ 1 last period | ☻ Bob Frapples | 821 requests<br>47 clicks (18%) | 54 Reviews<br>★★★★☆ 3.9/5.0 | Global Rank<br>18 | Highest Rank<br>6 |
| 7<br>◂ 1 last period | ☻ Paige Turner | 750 requests<br>47 clicks (18%) | 56 Reviews<br>★★★★★ 4.7/5.0 | Global Rank<br>22 | Highest Rank<br>4 |

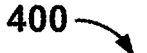
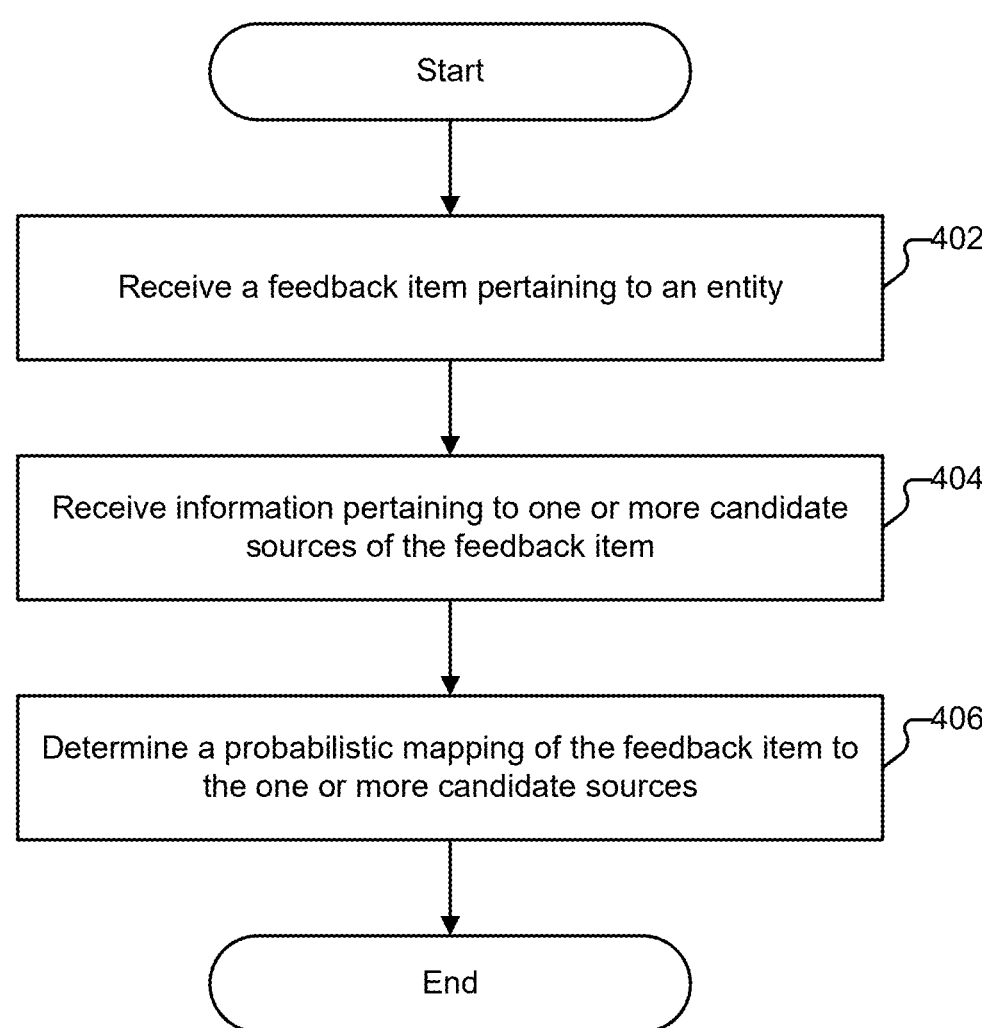
400
Start
Receive a feedback item pertaining to an entity ⌐402
Receive information pertaining to one or more candidate sources of the feedback item ⌐404
Determine a probabilistic mapping of the feedback item to the one or more candidate sources ⌐406
End
FIG. 4

FEEDBACK ATTRIBUTION

BACKGROUND OF THE INVENTION

Businesses are increasingly concerned with their online reputations. As more review websites are created, and as more users post more content to those sites, it is becoming increasingly difficult for businesses to monitor such sites. Further, it can be difficult for businesses to determine whether they need to, and how they can, improve their online reputations.

BRIEF DESCRIPTION OF THE DRAWINGS

Various embodiments of the invention are disclosed in the following detailed description and the accompanying drawings.

FIG. 3 illustrates an embodiment of a user interface.

FIG. 4 is a flow diagram illustrating an embodiment of a process for feedback attribution.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for probabilistic feedback attribution. Feedback may be left on various online sites, and the identity of who is leaving the feedback is not always clear, especially in the case of feedback that originates online. Using the techniques described herein, probabilistic mapping of the feedback to individuals is performed.

Figure 1:
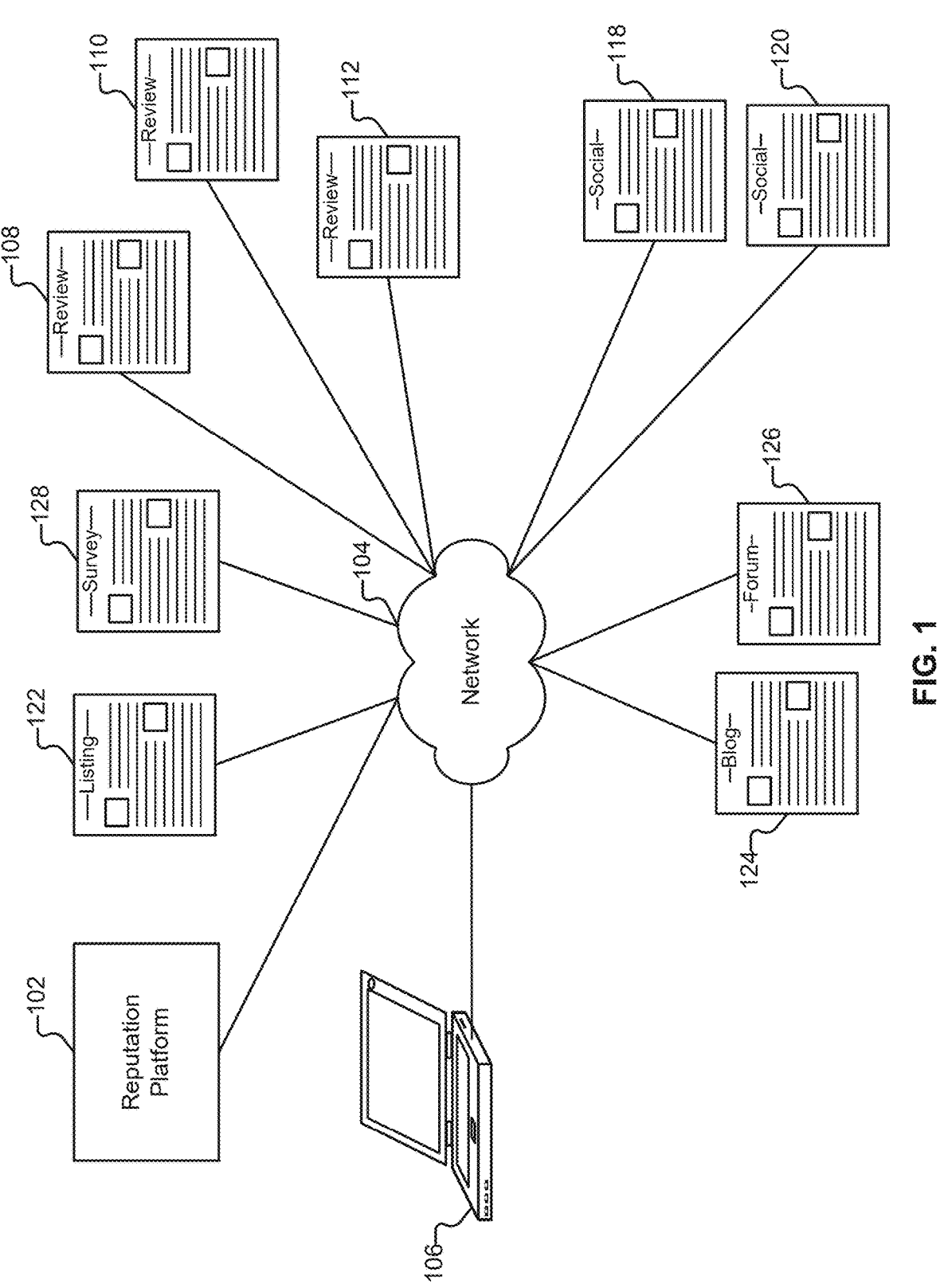
FIG. 1 illustrates an embodiment of an environment in which entity reputation information is collected, analyzed, and presented.

FIG. 1 illustrates an embodiment of an environment in which entity reputation information is collected, analyzed, and presented. In the example shown, the user of client device 106 is employed by a national chain of dealerships ("AutoBest"). As will be described in more detail below, the user can access the services of reputation platform 102 (via network 104) to track and manage the reputation of their business online. The techniques described herein can work with a variety of client devices including, but not limited to, personal computers, tablet computers, and smartphones. In this example, AutoBest is an entity that is a customer or subscriber of the services provided by platform 102. Such entities are also referred to herein as "tenants" or "rooftops," who may have one or more "locations." In the examples described herein, AutoBest is an example of a tenant or rooftop, with individual AutoBest dealerships being examples of locations.

Dealerships are but one example of an industry for which reputation management may be performed. Another example of an industry is the healthcare industry, where a tenant or rooftop is a hospital, and the locations are individuals such as physicians. While examples involving automotive dealerships are described herein for illustrative purposes, the techniques described herein may be variously adapted to accommodate other types of industries.

Reputation platform 102 is configured to collect reputation and other online feedback data from a variety of sources, including review websites 108-112, social networking websites 118-120, listing website 122, and other websites 124-126. In some embodiments, feedback data such as survey data is also provided to platform 102. In the examples described herein, review site 108 is a general purpose review site that allows users to post reviews regarding all types of businesses. Examples of such review sites include Google Places, Yahoo!Local, Citysearch, Yelp, Zagat, etc. Review sites 110-112 are specific to auto dealerships. Examples of auto dealership oriented review sites are Cars.com and DealerRater.com. Examples of social networking sites 118 and 120 include Twitter, Foursquare, Facebook, etc. Social networking sites 118-120 allow users to take actions such as "checking in" to locations, "liking" locations on profile pages of the location, giving "thumbs up" or "thumbs down," etc. Listing website 122 is a directory on which businesses can list information about themselves, such as their phone number, hours of operation, website, etc. An example of a listing website is Yellowpages.com. Some sites function as multiple types (e.g., Google My Business pages). Personal blog 124 and online forum 126 are examples of other types of websites "on the open Web" that can contain reputation information about an entity such as a business. In this example, external survey source 128 is a source external to platform 102 from which user surveys can be collected. Other examples of sources from which feedback data may be collected include repositories, homepages, websites, emails, call center recordings, cards dropped in a drop box (e.g., where the contents of physical cards may be digitized via data entry, scanning (e.g., optical character recognition (OCR), etc.), etc.

Platform 102 is illustrated as a single logical device in FIG. 1. In various embodiments, platform 102 is a scalable, elastic architecture and may comprise several distributed components, including components provided by one or more third parties. Further, when platform 102 is referred to as performing a task, such as storing data or processing data, it is to be understood that a sub-component or multiple subcomponents of platform 102 (whether individually or in cooperation with third party components) may cooperate to perform that task.

As shown in the example environment of FIG. 1, there are numerous sites on which individuals may leave feedback about AutoBest and/or AutoBest dealership locations. It would be beneficial to AutoBest if it could know whether a piece of feedback left on a source site was authored or could be otherwise attributed to an individual that AutoBest had engaged or otherwise interacted with. This would have various benefits in allowing AutoBest to better understand and gain insight into their online reputation.

However, determining who left a piece of feedback can be challenging for various reasons. For example, the information associated with a piece of feedback may vary from source site to source site. For example, just with respect to names, one site might list a reviewer's full name, another source site might list only the first name with a last initial, and yet another site may not even list a real name, but merely an online nickname. Further, there may be multiple people with the same name on a source site. As yet another example, a piece of feedback may not even have been left by someone who interacted with an AutoBest dealership. For example, in some cases, such as on social network sites, one person leaving negative feedback about a location may prompt other users (e.g., friends) to replicate the feedback or post their own negative feedback, even if those other people had never interacted with the location. As yet another example of a challenge, some feedback may be fake, where a competitor is writing fake reviews about themselves and/or other entities. Thus, for the above and other reasons, it may be challenging for entities such as AutoBest to determine to whom a piece of feedback is attributed.

Such challenges may be addressed using the probabilistic feedback attribution techniques described herein. In some embodiments, using the techniques described herein, AutoBest performs a probabilistic mapping of a piece of feedback to individuals. For example, using the techniques described herein, AutoBest may determine, for the piece of feedback, the probability that a given individual that is known to AutoBest left that piece of feedback. The probability that none of the individuals known to AutoBest left that piece of feedback may also be determined. Further, using the techniques described herein may be used by AutoBest to better understand who is leaving feedback for another entity, such as a competitor.

While examples involving auto dealerships are described herein for illustrative purposes, the feedback attribution techniques described herein may be variously adapted to accommodate entities belonging to any other type of industry, as appropriate.

Figure 2:
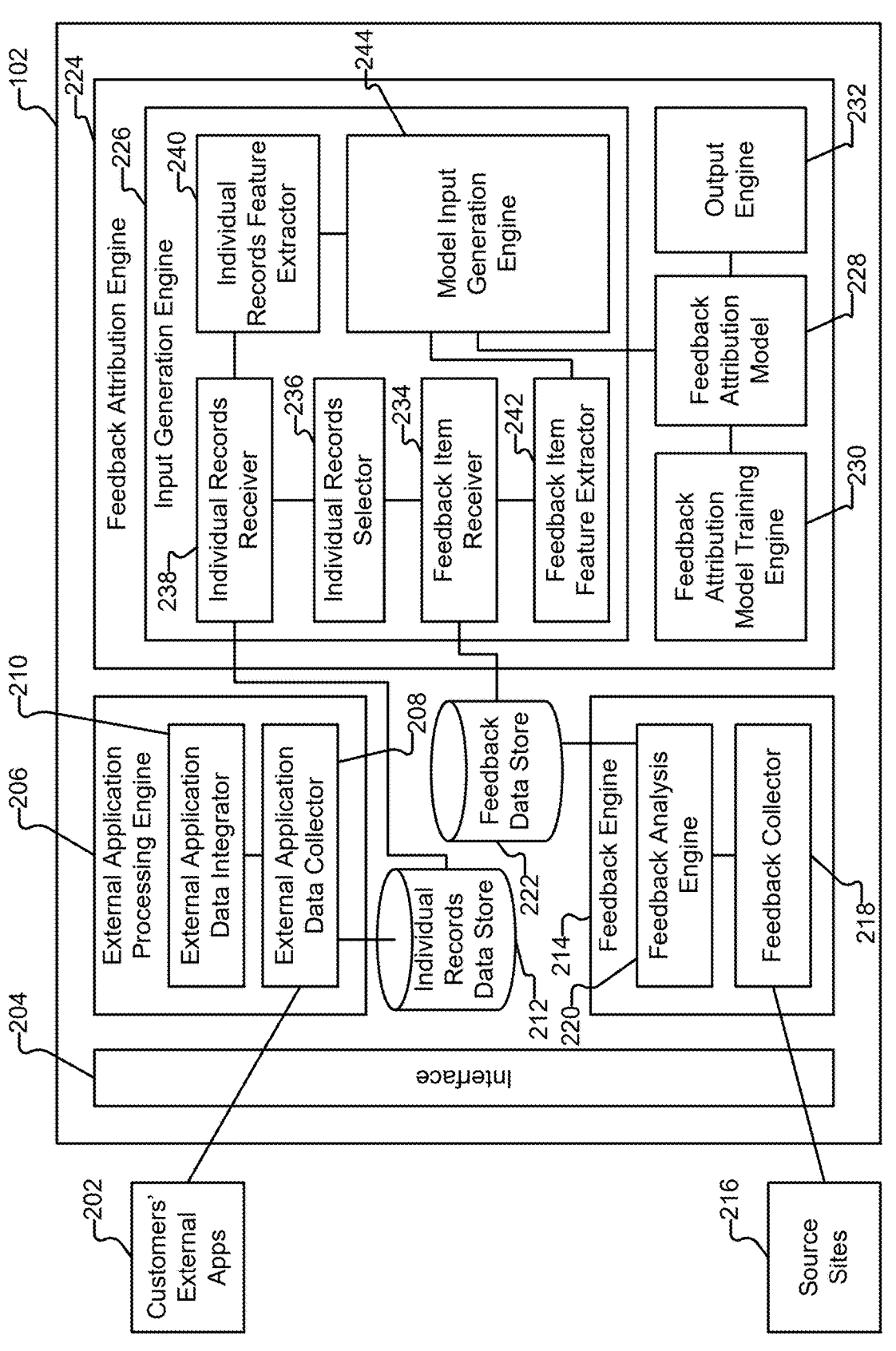
FIG. 2 illustrates an example of components included in embodiments of a reputation platform.

FIG. 2 illustrates an example of components included in embodiments of a reputation platform. In particular, FIG. 2 illustrates components of platform 102 that are used in conjunction with performing probabilistic feedback attribution. In this example, AutoBest is a "tenant" or "rooftop" that is a customer or subscriber of the services provided by reputation platform 102, which facilitates online reputation management for AutoBest and its locations. In the example shown, platform 102 includes an interface 204 for communicating with external entities over networks such as the Internet.

External Application Processing

Entities such as businesses may use applications such as customer relationship management (CRM) platforms (e.g., Salesforce, CDK, Authenticom, Yardi, etc.). In this example, AutoBest uses a CRM platform to record information about transactions or other engagement or interaction events that occurred with its customers. While examples involving CRM systems are described herein for illustrative purposes, the techniques described herein may be variously adapted to accommodate any other type of application.

Reputation platform 102 includes external application processing engine 206. External application processing engine 206 includes external application data collector 208 and external application data integrator 210.

External Application Data Collector

External application data collector 208 is configured to obtain data from external applications (202) such as CRMs. In some embodiments, connectivity between reputation platform 102 and a subscriber's (or customer of platform 102) external applications is supported using the Secure Shell (SSH) or Secure File Transfer Protocol (SFTP), application programming interfaces (APIs), etc.

In this example, AutoBest uses a CRM system to record engagements, transactions, or other types of interactions that occur between individuals and AutoBest and its dealership locations. Information pertaining to such interactions is collected by or provided to platform 102 (e.g., via the example connectivity described above). In various embodiments, a transaction event is provided or collected as raw structured data. The interaction event data may be in various formats, such as JSON, CSV, etc.

The following is one example of a data model for a transaction event recorded in a CRM for an AutoBest dealership that is collected by external application data collector 208. The example data model includes information describing a transaction event:

Transaction
    type—Sales/Service/Parts/Inquiry
    Date
    customer_id
    Details related to transaction
        Vehicle bought—year/make/model
        Date
        Related events—e.g., test drive, online inquiry, etc.
           And their related details
        Price
        VIN
        Sales agent
        Finance liaison
        . . .

As shown in the example data model above, the transaction event includes a customer identifier field. In some embodiments, this is an identifier of a customer of AutoBest. In some embodiments, platform 102 includes a data warehouse that stores information pertaining to the individuals (also referred to herein as customers) that had interactions with the AutoBest locations. As one example, information associated with the transaction event obtained from the external CRM application is stored to a record of a corresponding individual in individual records data store 212 on reputation platform 102.

In some embodiments, the external data source collector 208 is configured to extract fields from an interaction event and store them to the corresponding individual's record in data store 212.

As one example, a data model for an individual's record in data store 212 includes the following:

Customer
    name
    address
    phone
    other family members vehicle

Purchase date

Service dates—vector

Other interaction dates and parties

Sold by—

Finance—XXX

Service Advisor

Survey history—collection of surveys

When requested

Did they open

Did they complete

All results and verbatims

As shown in this example, an individual's data record includes aggregate information on everything known by platform 102 about the individual. This includes historical data about the individual, such as the example information described above obtained from a CRM. Other information extracted from transaction events is also stored (e.g., vehicle owned by user obtained from transaction information, when they had an interaction such as a car purchase or service, further details about such interactions, etc.). In some embodiments, the historical information associated with the individual may further include information such as emails, surveys sent to the individual, review requests sent to the individual, etc.

As will be described in further detail below, in some embodiments, the customer record also includes references or links to feedback items that are probabilistically attributed to the individual.

As described above, each individual made known to platform 102 (e.g., from the transaction events provided by the CRM) has a corresponding record in the individual records data store. If a new transaction event comes in for a known individual (e.g., with the same customer identifier in the transaction event), then that individual's record is updated. If a transaction event involving a new customer (with a new customer identifier that was not previously seen) is received from the external CRM application, a new record is generated in the customer data warehouse for the new customer. Example data warehouses for implementing the data warehouse 212 include Mongo DB, Big Query, Redshift, etc.

Thus, as shown in this example, each individual known to AutoBest and its locations also has a corresponding record on reputation platform 102 (and is therefore also known to platform 102), where the record for the individual includes not only information pertaining to interaction events from the CRM, but other information as well, such as historical information pertaining to feedback items associated with the individual. Thus, reputation platform 102 also has knowledge of the individuals that had interactions with AutoBest and its locations.

As will be described in further detail below, for a piece of feedback collected by platform 102, platform 102 determines, using the information about the individuals that platform 102 has learned of (e.g., from AutoBest's CRM application and/or from platform 102's own interactions with the individual), the probability that a given individual authored the review. CRM systems are but one example of a system from which information about the potential origins/sources of feedback items are obtained. The potential originators of feedback items (that leave the feedback items) may include various types of entities, such as individuals, groups of individuals, individuals operating in various capacities (e.g., as an individual or representative of a company), another business (e.g., competitor), etc., and information about such potential originators may be obtained from other systems, as appropriate.

External Application Data Integrator

In various embodiments, feedback data such as reviews, surveys, etc. collected from source sites (where feedback data collection is described in further detail below) may also be integrated or otherwise combined with other types of data to perform reputation processing. External application data integrator 210 is configured to integrate information from various external data sources (e.g., external applications 202) at platform 102. In one embodiment, the integrator is implemented as a set of rules that are based on both the data from the customer's external system and the reputation platform.

The following is one example of integration of reputation platform 102 with a CRM platform. As described above, in some embodiments, the CRM platform provides information about transactions that occur to platform 102 (e.g., via the example connectivity described above). As one example, AutoBest defines a rule that reputation platform 102 is to send out a survey for every transaction. Further, AutoBest can define rules that specify different types of requests to be sent for different types of transactions. For example, Auto-Best can specify a rule where if a transaction was the sale of a specific car model or that there was a service appointment at a dealership, then a survey is sent out pertaining to that particular car model (versus another model of car).

In some embodiments, the integrator has access to a source site to facilitate leaving of feedback. For example, suppose that the integrator has API access to Google. Suppose that a user has filled in a survey provided by platform 102. In some embodiments, the survey includes a link that, when clicked on by the user, allows their feedback to be posted directly onto Google via the API on their behalf.

Feedback Data Collection and Processing

Reputation platform 102 includes feedback engine 214. Feedback engine 214 is configured to collect and process feedback from sources sites 216. Feedback Engine 214 includes feedback collector 218 and feedback analysis engine 220.

Feedback Data Collector

Feedback data collector 218 is configured to collect feedback data from various source sites 216 such as review websites, listing websites, social network sites, industry-specific sites, blogs, etc., as described above in conjunction with FIG. 1. Examples of feedback data items collected by platform 102 include reviews, surveys, listings, social comments, search results, etc. In one example implementation, the feedback data collector is implemented as a set of Java modules.

Feedback collection may be performed in a variety of ways, which may depend, for example, on the source site from which the feedback data is obtained. As one example, feedback data is collected via an API (Application Programming Interface). For example, source sites such as Facebook and Google provide an API via which updates (such as real-time updates—also referred to as "RTUs") are provided that indicate when a new piece of feedback (e.g., social comment, review, etc.) is available for an entity (or one of its locations) on the source site being monitored by platform 102.

As one example, suppose that platform 102 is monitoring the social network, Facebook, on behalf of the AutoBest dealership franchise, which has multiple dealerships across multiple cities. In this example, platform 102 registers with Facebook, instructing Facebook to send an update to platform 102 whenever a review comes up, for example, for a specific dealership in a particular city. When the update from Facebook is received by platform 102, the feedback data collector then collects the new review from Facebook via the API.

While source sites such as Facebook and Google provide functionality to provide real-time updates on new feedback, such updates are not always guaranteed to be provided, and thus, in some cases, updates may not be sent out from the source site notifying platform 102 of the new feedback update.

To counter this issue of not being provided updates when new feedback is available (and thus causing platform 102 to miss feedback), in some embodiments, the feedback collection engine is configured to poll the source site for feedback. For example, on a periodic basis (e.g., hourly, daily, etc.), the feedback collection engine is configured to query the source site (e.g., using an API) for any reviews for a location being monitored. In some embodiments, performing the polling includes using credentials for the entity to obtain the reviews. For example, platform 102 obtains AutoBest's Facebook credentials, and uses them on AutoBest's behalf to access the feedback data for the various AutoBest franchises/locations (which may have their own respective profile pages on Facebook).

In some embodiments, the feedback collection is configured to collect feedback data by performing scraping. For example, in some cases, the approaches such as those described above for collecting feedback data may not be available. For example, a source site may not have the capability to provide real-time updates. As another example, polling may not be available for a source site because, for example, the functionality is not supported, or because there are no credentials available because the location changed their social network account password, such that the platform is no longer able to collect feedback data from the source site. As another example, some source sites do not provide interfaces such as APIs by which to query for and collect feedback data. In such cases, helpers such as web scrapers may be used to scrape feedback data from a source site. The scraping may be performed on a periodic basis (e.g., every 24 hours). The web scrapers may also be used to collect feedback data from sites where platform 102 does not have the ability to obtain credentials. For example, some source sites do not provide their API for reviews.

In some embodiments, the feedback collection engine includes one or more proxies used to facilitate feedback collection. One example of a proxy is a load distribution proxy. The load distribution proxy is configured to distribute, for example, the load for scraping for feedback.

Another example of a proxy is a geographical proxy, which allows queries/scraping to be performed from what appears to be different geographical locations. For example, when collecting feedback such as business listings or search results for a specific geographic region of interest, the platform may use the geographical proxy to simulate being in a particular geographic location that is different from the actual location of the server from which the query is originating. This allows, for example, the platform to simulate a search engine query for a user residing in Boise, Idaho, even though the server making the search query is actually in Santa Clara, California (because the objective is to obtain search results relevant to Boise).

Feedback Processing

As the feedback is collected, it is further ingested, analyzed, or otherwise processed by feedback analysis engine 220.

In this example, feedback analysis engine 220 is configured to assign tags to a collected feedback item, where in one embodiment, the tags include metadata describing or indicating characteristics of the feedback item. The characteristics of the feedback item are determined based on an analysis of the feedback item. As will be described in further detail below, the determined characteristics of the feedback item are used in further downstream processing of the feedback item, such as when performing probabilistic feedback attribution.

Consider, for example, a feedback item that is a review. One example set of tags is one that includes metadata indicating overall sentiment (e.g., positive, negative, neutral, N/A) of the review, categories or topics described in the review, the local sentiment of each category or topic in the review, impact of each category or topic on reputation score (described in further detail below), etc.

In this example of a review, in order to determine such tags, analysis of the characteristics of the review is performed. For example, a rating accompanying the review (e.g., a star rating provided by the review author) is obtained. The accompanying rating is used to determine an overall sentiment for the review (e.g., whether the overall sentiment of the review is positive, negative, or neutral). As another example, the overall sentiment for the review may be determined using sentiment analysis techniques.

Text analysis is also performed on the review to determine the content of the review, such as what categories or topics are discussed in the review. The text analysis may be determined from keyword determination, an analysis of phrases in the review, etc. For each of the topics or categories identified in the review, a sentiment for a given topic or category (referred to herein as the "local sentiment" specific to the category) is also determined, for example, by performing sentiment analysis of the text.

As one example, suppose a review for one of AutoBest's dealerships is received. The review is accompanied by a four star rating (out of five stars). The four star rating is used to determine that the overall sentiment expressed by the review is positive. A text analysis is used to determine that the dealership review includes topics such as sales and service. Sentiment analysis is performed for each of the topics to determine what was the reviewer's sentiment with respect to sales, and what was the reviewer's sentiment with respect to service. For example, based on the sentiment analysis of text related to sales, it is determined that the reviewer is neutral on sales, but based on the sentiment analysis of text related to service, the reviewer was positive on service.

Various other types of tags may be applied to the feedback item based on the analysis of the feedback item. As another example, a review may be tagged as a rant if the comment length equals or exceeds a threshold (e.g., 200 characters). A feedback item may also be tagged with the source of the feedback item (e.g., what source site the feedback item was collected from). In some embodiments, a feedback item may be tagged as having characteristics that have been identified as strengths or weaknesses of an entity. For example, it may be determined that the topic or category of sales is a weakness for an auto dealership. If a review is collected that, after analysis, is determined to include the topic of sales, the review is tagged as including a category that has been identified as a weakness for the entity (e.g., tenant or location) that is the subject of the review.

Different types of feedback items may be tagged with different types of characteristics. In the above example, tagging of a review was described. For another type of feedback, such as a listing, other types of tags may be determined and applied. For example, the accuracy of a listing can be determined, where the accuracy indicates how much of the information in the listing is correct. A tag indicating an accuracy of a listing is then applied to the listing. Other tags that may be applied include tags indicating inaccurate or incorrect data (e.g., a wrong phone number), tags indicating missing information (e.g., missing hours), etc.

In some embodiments, the tagging is performed according to rules that indicate the conditions (e.g., presence of a category, certain overall sentiment, listing accuracy, etc.) on which a tag should be applied. The tagging rules may be dynamically determined based on ongoing processing performed by platform 102. For example, the categories that are strengths and weaknesses may change over time (e.g., as an entity turns its weaknesses into strengths).

In some embodiments, to facilitate the further processing of a collected feedback item, the collected feedback item is placed on a messaging bus, where the messaging bus is used to pass, publish, or otherwise send the feedback item throughout platform 102 to be acted upon by various consumers. Feedback items may be queued on the messaging bus so that they are not dropped from the platform. In one embodiment, the messaging bus is implemented with high reliability, for example, using RabbitMQ. For example, as will be described in further detail below, in some embodiments, feedback items are processed to perform probabilistic feedback attribution.

In some embodiments, the processed feedback items are stored to a database such as feedback data store (222). In various embodiments, the database is implemented using ElasticSearch, MongoDB, etc. Different types of feedback items may be stored as objects of different types. For example, a review may be stored as a corresponding review object, a survey as a survey object, a listing as a listings object, a social comment as a social comment object, etc. Each of the different objects may have certain applicable properties that are specific to the object type. For example, a review object may include an overall rating, a comment, a source, a timestamp of when it was collected, etc. A listings object, in various embodiments, may have a name, an address, a phone number, a source, etc.

The following is an example of a data model for a review stored in the feedback data store 222, where the review was left on a review site for a location (e.g., dealership) of AutoBest. In this example, the data model includes features specific to the tenant and/or industry. Other data models for different types of industries may be different.

Reviewer
   Date
   Source
   Verbatim
   Other data either provided or pulled from review
     Vehicle
     People interacted with
     Actions
       Test drive, phone call, online inquiry, In this example, information pertaining to the review such as the reviewer (e.g., name, such as first name, last name, first initial, last initial, which may vary based on source), the source, and verbatim (e.g., verbatim text) may be specific fields and are metadata associated with the review, and are collected as structured data. In some embodiments, information that is not in a structured format (e.g., unstructured data) is extracted from the text of the feedback item, as described above, and stored as part of the record for the review. For example, a review site such as Google or Facebook that is not specific to dealerships may not have fields pertaining to the service advisor, sales advisor, make/model of a vehicle, test drives, etc. For such information, platform 102 may perform feature extraction using, for example, natural language processing, to obtain such information. The type of processing used to obtain information pertaining to a feedback item may be source dependent. For example, a source site such as Dealerrater that is tailored to the dealership industry may have more fields or structure for inputting data such as service advisor, test drive, etc., in which case platform 102 may not need to perform NLP to extract such information to be stored for the review on platform 102.

Feedback Attribution

As will be described in further detail below, probabilistic feedback attribution is performed to probabilistically map any piece of feedback to any individual. While examples of performing feedback attribution by determining probabilistic mappings between the feedback item and individuals that had interactions with a tenant are described herein for illustrative purposes, such individuals are but one example of potential sources/origins of the feedback item that are evaluated. For example, the mapping may be determined to groups of individuals, to individuals that are not customers of the tenant but are affiliated with another company and may be leaving feedback in such a capacity (e.g., as an employee of a business versus in an individual capacity), etc. The probabilistic attribution processing may also be variously adapted to accommodate other entities as the potential sources or origins of feedback (e.g., businesses that are leaving business-to-business feedback).

In the examples described herein, information about individuals that interacted with a tenant is obtained by the reputation platform from external applications such as CRM systems (e.g., by external application data collector 208, as described above). For example, via the CRM data, the reputation platform is able to determine everyone that received service at any time at any of AutoBest's locations. For example, from the CRM, the name of the individual that had a service, the service advisor, the appointment history, additional details, etc. are obtained. As will be described in further detail below, in some embodiments, for a piece of feedback being evaluated, various features or characteristics of the feedback item are extracted, such as name, time, text, location, geographic information, as well as other metadata, such as advisor, employees, department, condition, make, etc. (e.g., using feedback analysis engine 220, as described above). In some embodiments, as will be described in further detail below, the information from the CRM system regarding various individuals is evaluated against the features of the feedback item to assess the probability that each of the individuals authored the review.

As will be described in further details below, in some embodiments, machine learning models such as logistic regression are used to determine the probability that a given person left a feedback item such as a review. The use of a model to determine probabilities such as that described herein is in contrast to existing systems which perform matching using a heuristic. Here, in the examples described herein, a model is built and trained to assess the probability of how likely a given individual left a piece of feedback. Using the model described herein, platform 102 is able to determine probabilities at scale for numerous individuals that might otherwise be anonymous. Further, the probabilistic attribution model described herein may be used to assess probabilities that a heuristic may not be able to (e.g., that there is a 50% or 20% likelihood that a user wrote a review, or that out of the individuals evaluated, it is likely to be one of a smaller subset of individuals that left a piece of feedback, or that there are 5 people that might have written the review, where a first person has a 32% probability of having left the feedback, there is a 7% that another person wrote it, and that there is an 18% probability that none of the evaluated individuals wrote the review, indicating that the review may have been written by somebody that never came to a dealership). This provides increased accuracy as compared to existing systems that use heuristics. Such probabilistic attribution is especially beneficial, for example, in cases where there is not near certainty on who left a piece of feedback. Further details regarding the model and training of the model (including gathering of training data) are described below.

In the following examples, a model is used to determine a probabilistic confidence or understanding that a person left a piece of feedback. Examples of such a confidence model and training of such a model are described below.

Reputation platform 102 includes feedback attribution engine 224. Feedback attribution engine 224 is configured to determine a probabilistic mapping of a feedback item to individuals in a group of individuals. In some embodiments, determining the probabilistic mapping includes determining, for each individual, a percentage probability or likelihood that a given individual in the group authored the review, or that the feedback item is otherwise attributed to the given individual. As shown in this example, feedback attribution engine 224 includes input generation engine 226 and feedback attribution model 228. As will be described in further detail, in some embodiments, input generation engine 226 is configured to generate the input to feedback attribution model 228. As will be described in further detail below, feedback attribution model 228 is used to determine a probabilistic confidence or understanding that a person or group of people left a piece of feedback. Examples of such confidence models are described below. Feedback attribution engine 224 further includes feedback attribution model training engine 230. As will be described in further detail below, feedback attribution model training engine 230 is configured to train feedback attribution model 228. Examples of such training are described below. Feedback attribution engine 224 further includes output engine 232, which is configured to perform processing based on the output of feedback attribution model 228.

Feedback Attribution Model Input Processing

Examples and details regarding generating the input for the feedback attribution model are described below.

In this example, feedback item receiver 234 is configured to receive a feedback item on which feedback attribution processing is to be performed. This includes performing feedback attribution processing on feedback items collected, as described above, by platform 102. In some embodiments, feedback item receiver 234 receives or obtains a feedback item from a data store such as feedback data store 222. For example, feedback attribution processing may be performed as a batch process on a time-driven basis (e.g., daily, nightly, weekly, etc.). As another example, a feedback item is received or obtained in response to a trigger or condition having been met (e.g., when a new individual is identified). In other embodiments, a feedback item on which feedback attribution is to be performed is received in (near) real time, where for example, the output of feedback analysis engine 220 (e.g., an analyzed and tagged feedback item) is evaluated for feedback attribution processing as it is being ingested (where, for example, the feedback item is stored to feedback data store 222 in parallel to the feedback attribution processing).

In some embodiments, individual records selector 236 is configured to, based on characteristics of the feedback item received by feedback item receiver 234, determine a set of individuals to which the feedback item is to be probabilistically mapped.

In some embodiments, determining the set of individuals includes querying a data store such as individual records data store 212 for records and historical information pertaining to individuals that meet a set of query/filter criteria. The query/filter/selection criteria are based on characteristics of the feedback item to be evaluated.

As one example, individuals are filtered based on a location to which the feedback pertains or is directed to. For example, if a review was left on a review site page for a specific AutoBest dealership, then records in data store 212 are filtered to exclude those individuals that did not have an engagement with that AutoBest dealership location (and to select those individuals that did have an interaction with that AutoBest dealership location).

In some embodiments, individuals are filtered or selected based on a temporal characteristic. For example, individuals in individual records data store 212 are filtered based on whether they have interacted with an entity or entity location (associated with the feedback item) within a certain time period. In some embodiments, the time period of interest is determined based on a date associated with the feedback item (e.g., the date that the feedback item was posted to or published on a source site). For example, the time period may be the several months before the date of the review, the last year prior to the date of the review, etc. In some embodiments, the time period includes a period of time after or subsequent to the date of the review (e.g., 5 to 7 days after the date of the review). This is to address the problem of potential mismatches, where for some source sites, the date that the source indicates as the date on which the feedback was left is not actually the date on which the feedback was authored or left by the author.

As another example, in some embodiments, individuals are filtered/selected based on an interaction type indicated by the piece of feedback (e.g., determined through text analysis performed by feedback analysis engine 220, as described above). For example, if the piece of feedback is determined to pertain or relate to a service appointment, then individuals from the data store (e.g., from CRM side) are filtered/selected by whether they had a service appointment.

Combinations of the aforementioned criteria may be used to filter individual records to determine a relevant or otherwise applicable set of individuals on which to perform probabilistic feedback attribution for a given feedback item. For example, individuals may be selected that had an interaction of a certain type at a specific location within a certain time period based on the characteristics of the feedback item to be evaluated. In various embodiments, selection of a set of individuals is based on other criteria. The criteria may be at varying levels of granularity. Selection of a set of individuals may be based on combinations of characteristics. For example, the attribution processing may be configured to evaluate behavior of particular users across different dealerships, or even different brands, industries, etc.

In some embodiments, individual records selector 236 is configured to generate and perform a query on individual records data store 212 for individual records based on selection/filtering criteria determined based on the characteristics of the feedback item to be evaluated.

In this example, individual records receiver 238 is configured to receive the results of the query made by individual records selector 236. In some embodiments, individual records data store 212 provides, in response to the query for individuals, a set of customer identifiers corresponding to individuals in the data warehouse that match the filtering/selection criteria. In some embodiments, the received records include historical information usable to perform feedback attribution processing. In some embodiments, for each customer, the factors that are of relevance to the feedback attribution processing are compiled for the customer identifier (e.g., that is in the example data model described above). In the example of the dealership industry, in some embodiments, for a given individual, the following is obtained from the data warehouse in various embodiments: customer name, most recent transaction, date of the transaction, as well as information relating to the transaction/interaction, such as vehicle make, model, service advisor, etc. Different historical information for an individual may be obtained for different industries.

Features of the feedback item and the selected individuals are used to determine the probabilistic feedback attribution mapping. In some embodiments, features of the feedback item to be evaluated, and features of each identified/selected individual, are extracted and evaluated to determine an input to the feedback attribution model. In some embodiments, the features that are extracted and the evaluation to be performed are based on the factors taken into account by the feedback attribution model. For example, in some embodiments, the feedback attribution model takes as input a set of attribution feature vectors, where the values for the factors/components in each of the attribution feature vectors are determined based on the characteristics/features of the feedback item, the characteristics/features of a given individual, or both. Examples of factors that are considered are described below. Other factors or components may be considered in the model. For example, different industries may have different sets of factors that are evaluated.

The following is a list of example factors/components of a feedback attribution model for the dealership industry:
  First name match
  First name mismatch
  First name match—nickname
  Last name match
  Last name mismatch
  Vehicle make match
  Vehicle make mismatch
  Vehicle model match
  Vehicle model mismatch
  Location name match
  Location mismatch
  Review within 3 days
  Review within 7 days
  Review within 30 days
  Sales experience match
  Sales experience mismatch
  Service experience match
  Service experience mismatch
  Agent first name match
  Agent first name mismatch
  Agent last name match
  Agent last name mismatch As shown in this example, the attribution model input feature vector encodes information about the feedback item, information about an individual, as well as what is a match/mismatch in values of an attribute from the feedback item side and an individual's historical information. For example, the features selected to be in the attribution model input feature vector include any piece of information that matches/mismatches between features of feedback items and features of individuals. The feature selection may vary for different industries, different feedback sources, different CRMs, etc.

In some embodiments, the selection of what features to include in the set of attribution feature vectors is based on what information is determinable from the individuals' data and/or the feedback item data. For example, the factors may be dependent on what is available from CRM data. The feature selection may also be based on whether the information from the CRM data is also determinable from a review (or, for example, whether what is stored for an individual by platform 102 is also determinable from a feedback item). In some cases, even if it is unlikely that a review would include a value for a feature that is available in CRM data (e.g., a VIN number, where it may be in CRM data, but less likely to be in a review), it is still selected as a feature.

As shown in this example, values for some of the factors, such as "review within 3 days" are based on features of the feedback item. However, as also shown in this example, some of the factors indicate different types of matches between features of the individual data known to platform 102 (e.g., via the CRM integration) versus the features of the feedback item. For example, first name match and first name mismatch are included, where a first name match is determined if the first name for an individual's record matches a first name associated with the feedback item (which would in turn make the first name mismatch false). Further details regarding generating the input to the feedback attribution model based on features of the feedback item and the individuals will be described below.

The model may be extended in various ways. For example, the name match versus name mismatch may be extended to encode that there is a match on a rarer name, which the model may provide a higher confidence weight. Thus, the complexity of the model may be increased.

In some embodiments, individual records feature extractor 240 is configured to extract, for each individual's record received by individual records receiver 238 (where multiple individuals may have satisfied the selection/filtering criteria), a set of corresponding features. As described above, the features extracted for each selected individual may be based on the factors/components in the feedback attribution model, including, for example, first name, last name, nickname, vehicle make (if applicable), etc. (e.g., in order to determine the values of the input feature vector). In some embodiments, a feature vector is generated for each individual identified based on the selection criteria.

In some embodiments, the feature vector is provided in response to querying of the individual records data store, where those features that are used to determine input factor values are queried for, and placed in a feature vector for each individual.

In some embodiments, on the feedback item side, feedback item feature extractor 242 is configured to extract features from the feedback item to be evaluated. In some embodiments, performing the feature extraction includes determining the values for features of the feedback item usable to determine the input to the feedback attribution model. In some embodiments, the output of the feedback item feature extractor is a feature vector. The information included in the feedback feature vector may be dependent on the source from which it is obtained, and may include factors such as first name, last name, last initial, etc. (For example, Yelp may only provide last names, while some sites provide only first names, while other sites may not use real names but instead allow nicknames). The feature vector may include the date that the feedback item was authored or left on a source site. The feature vector may also include metadata determined based on tagging of the feedback item.

Model input generation engine 244 is configured to generate the input to the feedback attribution model. In some embodiments, the input to the feedback attribution model is a matrix, table, or other data structure that includes a set of attribution feature vectors, wherein each attribution factor corresponds to a specific pair of the feedback item and a given individual in the set of selected individuals. The feedback attribution vector for a given pair is based on the features of the feedback item and/or the features of the given individual in the given pair.

Examples of factors/models in an attribution feature vector are described above. In some embodiments, the values for each factor are binary (either 0 or 1), where 1 if true, and 0 if false or unavailable (e.g., because there is insufficient information on either the CRM side and/or the feedback item side to perform matching). In other embodiments, rather than binary values, other values may be used. For example, scores may be used to determine a level of match, where the score is used as a value to a factor. In other embodiments, similarity scores with thresholds to determine how closely database individual-side and feedback-side features match are then used in the model.

In this example, the values for the input factors/components of a given attribution feature vector are based on the features extracted from the individual records and the features extracted from the feedback item. As described above, some of the factors to be used as input to the feedback attribution model are based on a comparison or evaluation of information from two different sources, where on one side there is information about an individual known by platform 102 (e.g., collected from an external application such as a CRM system), and on the other side, information about a feedback item collected from a source site. In some embodiments, the values for such factors are determined by model input generation engine 244, which in some embodiments is configured to perform, for each individual in the set of individuals to be evaluated, a comparison of the values for the same corresponding factor from an individual's recorded historical information and from the feedback item.

As numerous individuals with records on platform 102 may match the selection criteria based on the characteristics of the feedback item, in some embodiments, as described above, model input generation engine 244 creates a data structure such as a matrix or a table of input feature vectors. For example, in one embodiment, an input attribution feature vector is generated for each pairing of the feedback item and a given individual (in the set of selected individuals).

For example, suppose that 1000 individuals' records were identified that fit the filtering/selection criteria. The above described matching is performed to determine an attribution feature vector of 0's and 1's of what information matches on each side (individual record side information and feedback item side information) for each of the 1000 individuals. In some embodiments, this results in the generation of a table with 1000 rows, where each row is an attribution feature vector generated for the specific combination of the feedback item and a given individual. As will be described in further detail below, a machine learning model, such as a regression model, is applied on each of those pairs (of feedback item and a particular individual) to determine, for each individual, the likelihood that the individual wrote or authored that review.

The input attribution vectors generated for each pair of feedback item/individual are provided as input to a machine learning model. As described above, in various embodiments, the input is a matrix or a table, where each row of the matrix/table corresponds to a pair of the feedback item and a given individual, and includes the attribution input feature vector determined for that pair.

Probabilistic Mapping Using a Feedback Attribution Model

In this example, the output of input generation engine 226 is provided as input to feedback attribution model 228. As one example, the table or matrix of attribution feature vectors is provided as input to a multinomial logistic regression model, which applies a weight to each factor. As output, the machine learning model provides a probability distribution vector that includes, for each individual, a probability or likelihood or percentage confidence that the individual left the feedback item (or that the feedback item is otherwise attributed to that individual). Thus, for example, if 1000 individuals were evaluated, then an output probability vector including 1000 probabilities is generated. In some embodiments, each probability is associated with an identifier of the feedback item and an identifier of a corresponding individual (e.g., to uniquely identify the pair or combination of feedback item and individual that a given probability was determined). While an example involving a multinomial logistic regression model is described herein for illustrative purposes, the feedback attribution techniques described herein may be variously adapted to accommodate any other type of machine learning model as appropriate. Other examples of models that may be used, without limitation, include other models that incorporate regression, decision trees, neural networks, Bayesian inference, or other approaches. Ensemble or hierarchical models combining multiple approaches may also be used in various embodiments.

In some embodiments, the feedback attribution analysis is implemented using Python, R, or other data analysis tools. In some embodiments, the analysis is performed, and the output generated, via a custom-built processing and user interface (UI) engine. In some embodiments, the output of the feedback attribution processing (e.g., probability vector) is stored. For example, the output may be stored in a relational data structure such as MySQL, Redshift, BigQuery, or an alternative structure such as MongoDB or a custom data store.

Output Processing Based on Probabilistic Feedback Attribution

By using the probabilistic feedback attribution techniques described herein, a tenant such as AutoBest is able to probabilistically determine who, in the various people that AutoBest has interacted with, left a piece of feedback, and once the probabilities are known for certain individuals, AutoBest or the reputation platform can then use that probabilistic information to further bring in more information and gain further insights. Examples of processing that may be performed based on the output of feedback attribution model 228 are described below. In some embodiments, output engine 232 is configured to process the probability vector outputted by feedback attribution model 228.

In some embodiments, user interfaces are provided to users of the platform. For example, UIs for aggregating reviews that have been attributed to certain entities such as individuals, service advisors, sales people, etc. are generated. In some embodiments, a leaderboard is created.

In various embodiments, as will be described in further detail below, various actions are performed based on the output of the probabilistic feedback attribution machine learning model (e.g., by using the output probability vector that includes probabilities for each feedback item/individual pairing).

In some embodiments, information based on the probabilistic feedback attribution is stored for the feedback item. As one example, the output probability vector is stored as information for the feedback item that was evaluated. For example, an array of individuals (identified by their customer IDs) and their corresponding probabilities are stored to the record for the feedback item (e.g., to the entry for the feedback item in feedback data store 222). In some embodiments, only those individuals with a non-zero probability (or some probability above some threshold, which in some embodiments is set to be close to zero) are included in the array.

Another example of information that may be stored for the feedback item includes links/references to the individuals in the array. As another example, the probability that none of the evaluated customers authored or left a feedback item is stored for the feedback item (i.e., the probability that none of the individuals known to platform 102 left the feedback item). In some embodiments, the probability that none of the evaluated individuals left the feedback item is computed as 1 minus the sum of the probabilities determined for the evaluated individuals.

In some embodiments, an indication is stored that probabilistic attribution has been performed for the feedback item. For example, a Boolean value indicating whether attribution has been performed is associated with the feedback item.

In some embodiments, the record for the feedback item includes information usable to determine whether probabilistic attribution should be performed again for the review. For example, rules or logic are implemented that trigger re-evaluation of feedback items. This includes, for example, rules for triggering re-evaluation of a group of feedback items, such as those pertaining to a location, where those feedback items may include feedback items that have not yet undergone probabilistic feedback attribution (which may be determined on the Boolean value described above), or have previously gone through feedback attribution processing, but were not attributed to any individual known to platform 102. As one example, the re-evaluation of a group of feedback items is triggered in response to an individual being identified (e.g., from interaction events received from the external CRM application). In other embodiments, collection of a new feedback item triggers a re-evaluation of all feedback items where the platform was not confident of the author (where the confidence may be a threshold value or some other statistical measure).

In some embodiments, if an individual is determined with a high confidence (e.g., above a threshold such as a threshold percentage or above a threshold number of standard deviations), then the feedback item is attributed to the individual, and the feedback item is included or otherwise referenced or linked to the individual's record of historical information. In some embodiments, the username or handle associated with the feedback item is also associated with the individual. In this way, in some embodiments, platform 102 also determines alternative channels by which to target an individual. For example, platform 102 links the individual with a username on the source site (e.g., by obtaining the username from the source site when collecting the feedback). In some embodiments, if it is determined by the probabilistic feedback attribution engine that an individual has left certain pieces of feedback on different source sites, then platform 102 determines, probabilistically, the source sites on which the individual has an account/profile. In some embodiments, platform 102 joins the profiles of the individual on the various source sites based on the feedback attribution processing. In some embodiments, based on the knowledge of which profiles on what source sites belong to the individual, platform 102 collects historical feedback items pertaining to those profiles that were probabilistically determined to be associated with the individual (who was identified, for example, from another application such as CRM data, as described herein).

In some embodiments, a client record in the CRM (or in the client record on the platform generated using information from the CRM) is enhanced when a match is found. In some embodiments, specific follow-up actions are triggered, such as contacting a customer or remedying an open issue.

In some embodiments, normalization is performed. For example, the sum of the individual probabilities is determined. If the sum of the probabilities across the individuals is greater than 1, then normalization is performed (so that, for example, after the normalization, the total probability sums to 1). In some embodiments, normalization is not performed if the sum probability does not exceed 1, as there is a possibility that it was none of the evaluated individuals that wrote the review.

In some embodiments, feedback attribution engine 224 determines the probability that the feedback item is attributed to none of the evaluated individuals. In some embodiments, this is done by summing up all individual probabilities (that the individual left the review), and subtracting that summed value from 1. Based on the probability that none of the evaluated individuals wrote the review, various processing may be performed. For example, if there is a high probability (e.g., above a threshold) that none of the CRM-side individuals left the piece of feedback, this may lead to further processing to determine whether the review is a fake review, whether the review was left by someone at a different dealership (and the author left a review for the wrong dealership), etc.

As another example, if it is determined with a certain confidence that none of the individuals wrote the review, then this may be an indication that whoever wrote the review is not being totally honest about the information that they are putting in the review. Based on this determination, AutoBest may be prompted to perform actions such as petitioning the host (e.g., source site that is hosting the review) to have the review removed, to contact the reviewer and inform them of their error, or to take some other action.

There are various reasons why nobody is able to be attributed to a piece of feedback. For example, it may be the case that the entity AutoBest is not providing all of their customer data. As another example, reviewers may write reviews about locations or businesses that they did not have an interaction with (where the reviewer is not actually a customer known to the entity's CRM system). As another example, the reviewer may be a customer in the CRM, but the person's name is not available. For example, rather than requiring a real name, some review sites may allow people to use fake names, such as "howdycowboy999," which would reduce the match/attribution rate of the machine learning model, whereas the attribution would be much higher for the same review on another site that requires a real name. In such a case, the platform may provide to AutoBest recommendations or suggestions of actions to take. Such suggested actions may include responding directly to the review to ask for more information that may help to clarify who is leaving a review (e.g., asking for a date of service or the Service Advisor that the reviewer worked with), or to solicit (either online or offline) customer specific information such as a name or phone number.

As another example, based on the probability that none of the evaluated individuals wrote the review, it is determined whether to re-perform the attribution processing, where the attribution processing may be performed with different criteria. For example, if the probability that none of the evaluated individuals wrote the review exceeds a threshold (or the sum of the individual probabilities is less than a threshold), then the attribution processing is re-performed with different filtering criteria, such as expanding the filtering time period (which may increase the pool of matching transactions/individuals).

As described herein, the probabilistic feedback attribution processing provides a distribution of probabilities across a number of individuals. Various processing may be performed based on how the probabilities are distributed across the individuals, even if the probabilities do not, with high likelihood or confidence, attribute a piece of feedback to a single individual.

Suppose, as one example, that it is determined, based on assessment by the model, that the probabilities for two individuals was 1, or very close to 1, with the attribution probability being close to 0 for all other individuals. That is, in this example, the model has determined that it is equally likely that two individuals left the feedback item. In some embodiments, this is an indication that the two individuals are actually the same person (where two different records had been created for the same individual in the customer data warehouse). In some embodiments, in response to such an indication, cleanup of the customer records is performed based on the output of the attribution modeling, for example, by merging the two records together.

As another example, suppose that a site only provides last initial (e.g., to protect user privacy), and a review being evaluated has the name "John S." with no comment about a certain dealership. Suppose that there are three John's from the CRM side that are John S. Based on the attribution modeling, it is determined that one John S. has a likelihood of 30% of having written the review, another John S. has a likelihood of 20% of having written the review, and another John S. is attributed a 10% probability of having written a review, leaving a 40% probability that none of them left the review. In this example, where there is not a clear indication of who wrote the review, such information is stored. For example, each John S. is kept track of, and their determined probability of having authored the review is recorded. In some embodiments, the determined probabilities are paired with information about the review (e.g., via a link). For example, suppose that the review that was evaluated was a negative review. For the John S. that it was determined had a 30% chance of writing the review, platform 102 sends to AutoBest, for example, information indicating that there is a 30% chance that this John S. (who may have a unique identifier) wrote a negative review. AutoBest may use that combined probability/feedback information associated with the evaluated individual to take further action.

In the above example involving John S., additional information is used to determine whether one of the individuals is more likely to have written the review. For example, further historical information may be used to further modify the attribution probabilities. As one example, for each individual, it is determined, from their historical information, whether they have previously left feedback that has a same sentiment as the piece of feedback on which attribution modeling had been performed. For example, suppose that there are two John S.'s that are equally likely to have written a particular review on which feedback attribution was performed, where the particular review has a negative sentiment. If one of the John S.'s has previously left negative feedback in the near past (e.g., within a time period), then the percentage likelihood that individual left the review is increased to indicate that it is more likely that they left the review.

In some embodiments, the determined attribution probabilities are used to address the issue of fake reviews. For example, if a certain dealership or location has a disproportionately high number of reviews that are not attributable to any individual known to platform 102, then a warning flag is sent to the location/tenant indicating the potential presence of fake reviews (e.g., because someone is writing their own fake reviews, a competitor is writing fake reviews, etc.).

In some embodiments, the probability that the review was not authored by any of the entities that were considered/evaluated is compared against a threshold. If the probability that the review was not authored by any of the considered entities is above the threshold, then the review is flagged. In some embodiments, the review is also flagged if the review matches a particular entity, but the contents or facts associated with the review do not match the records available to the platform (e.g., the review claims issues relating to a service that is not in the platform's records from the CRM system). Such scenarios are potentially indicative that the reviewer is being untruthful, or may indicate missing or false data in the client records stored on the platform (e.g., in individual records data store 212). In some embodiments, the system sends an alert to AutoBest indicating that there is a potential fake review. In some embodiments, the alert includes a link to the potential fake review so that the AutoBest operator may see the review.

As yet another example, the attribution analysis can also be used to determine whether an observed volume of reviews is not due to customers of the location/tenant, but due to other individuals that did not actually have any interaction with the location/tenant. For example, in some cases, such as on social networks, one user may post a negative review, and then friends of that individual copy the review, thereby causing negative reviews to propagate, even though the individuals did not actually interact with the entity (rather they have written a negative review about a location because their friend was upset about it). In this example, based on the attribution analysis, it can be determined the probability of who wrote the review, and if there was an individual that actually had an interaction with the location/tenant that has a high probability of having written the review, then it can be determined that other reviews that have copies of the text or similar text (e.g., based on a similarity detection) are copies of that attributed review. This can then be flagged to the location/tenant.

In some embodiments, to further enhance or improve the efficacy of determining fake reviews, training data is gathered on fake reviews versus real reviews. Measures that indicate fakeness (e.g., excessive use of capitalizations, excessive use of certain words, phrase, or topics, etc.) are incorporated into the machine learning model used to perform feedback attribution. Further details regarding training o a feedback attribution model are described below.

As described above, one example of actions that may be taken based on an analysis of the output of the attribution processing is to send alerts to users. For example, as described above, users may be notified of suspect reviews, and also provided a link to view such reviews.

Another example of actions that may be taken is to generate a leaderboard. FIG. 3 illustrates an embodiment of a user interface. In this example, a leaderboard showing a ranking of customer satisfaction of AutoBest associates is shown. In this example, reviews are tied to associates who have served customers and satisfaction of those customers is tracked.

In this example, the values are determined as follows. With respect to Mario Speedwagon (302), 987 requests were sent out (304). In this example, the value 987 is determined as the count from the CRM system side of how many customers Mario serviced in the last year (or any other time period as appropriate). In this example, each of those 987 customers that had been serviced was sent a review request.

The value of 101 reviews (306) is the number of reviews that were determined to be attributed (e.g., by using the feedback attribution processing described herein) to customers that had been serviced by Mario Speedwagon in the last year. As one example, a set of individuals to be evaluated is determined by identifying, from the records in individual records data store 212, who had a service appointment with Mario in the last year. Separately, a set of feedback items is received. For a feedback item in the set, such as a review, feedback attribution is performed to probabilistically map the review to the set of identified individuals. This is performed, for example, to determine what reviews (in the feedback items that were collected by the platform) were left by customers who had their vehicle serviced by Mario Speedwagon in the last year. Analysis of those reviews determined to have been left by customers of Mario Speedwagon can then be performed to determine, for example, the satisfaction those customers had with their service with Mario Speedwagon. If, for a given review, the likelihood that a given individual left that review exceeds a threshold, then the review is attributed to that given individual. If the likelihood that none of the individuals left the review is above a threshold, then it is determined that none of the individuals left the review, and the review is not attributed to any of those individuals. Those reviews that were attributed to (i.e., probabilistically determined to be left by) an individual that had been serviced by Mario Speedwagon are then aggregated together. Those reviews may then be evaluated to determine a satisfaction of those customers. For example, the satisfaction (4.7/5.0 in this example) is determined by averaging the overall rating for each of the 101 reviews determined to have been attributed to customers that had their cars serviced by Mario Speedwagon in the last year. Mario Speedwagon is then ranked based on the sentiment of the reviews attributed to customers whose vehicles had been serviced by Mario Speedwagon. The ranking may also be based on other factors such as total number of requests, number of attributed reviews, etc.

Training a Model for Probabilistic Feedback Attribution

The following is an embodiment of training a machine learning model for probabilistic feedback attribution. In this example, training of the above multinomial logistic regression model is described for illustrative purposes. The techniques described herein may be variously adapted to accommodate training of other types of machine learning models for probabilistic feedback attribution.

The following is an embodiment of selecting training data for training of a machine learning model for performing probabilistic feedback attribution. In one example, feedback items for which the authorship is known are selected automatically. An example of such a review is one that reputation platform 102 posted on behalf of an individual. For example, as described above, via external application data integrator 210, platform 102 sends out surveys or review requests to individuals in response to transactions or interactions that occurred between an individual and a tenant (and were recorded, for example, in a CRM). In some embodiments, platform 102 posts a review on the individual's behalf, or the CRM individual posts a feedback item such as a review to a review site provided by platform 102 (e.g., using integrator 210 described above). As one example, the user clicks on a link in a survey or request for feedback that causes their feedback to be posted directly to a source site via API access that platform 102 has to the source site. That is, platform 102 knows who left the piece of feedback because the piece of feedback was generated using platform 102, and platform 102 was directly responsible for that piece of feedback. In such cases, the platform has complete certainty over the author of the feedback item, where, for example, the platform knows that a piece of feedback was generated in response to a review request, and that the piece of feedback is definitely attributed to a specific individual. In these cases, platform 102 knows the identity of who left a piece of feedback. For example, as described, in some embodiments, platform 102 sends out review requests and posts reviews on behalf of the people (who are identified via CRM data) to whom the review requests were sent.

In other embodiments, feedback items are manually validated or matched to CRM individuals. As another example of determining training data, in some cases, when individuals leave feedback, they are responded to (e.g., by someone working at a location or tenant), and through the course of the communication, additional information is obtained (e.g., further details about an interaction), allowing the identification or validation of the individual that left the review. For example, when such reviews are updated, the sequence of feedback update events is matched to a sequence of interactions between an entity and the individual. Such reviews may also be used as training data.

The following is an example of training the feedback attribution model. Suppose that 100 reviews are identified (e.g., using the training data selection techniques described above) where the individual that left the piece of feedback is known. Suppose that the information (e.g., transaction information) associated with 1000 CRM individuals is obtained.

Using the above example machine learning model factors, an input training data structure is generated. For example, each of the factors is taken as a binary value (0/1). If for instance there is no first name, then the factor of "first name match," "first name mismatch," and "first name match—nickname" are all given a value of 0. These are, for example, the input variables.

With 100 reviews by 1000 customers, this results in a row of data for each review and customer pair (resulting in 100,000 rows of data). Other data structures may be used. In this example, each review/customer pair is also labeled. For a given review in the training data, the author or individual who left the piece of feedback is known, and the corresponding review/customer pair is labeled as being a match. For the remaining 999 customer/review pairs for that given pair, those pairs are labeled as not being matches. That is, the output variable is whether or not a given piece of feedback relates to a given customer, which may be manually and/or automatically tagged for each review.

The following is an example row of the input training data structure:

[customer_id, feedback_id, [attribution feature vector],
    attributed (0/1)]

where in some embodiments, the identifier of the customer and the identifier of the feedback item ("customer_id" and "feedback_id", respectively, in the above example data structure) are maintained for reference, and the actual input data to be used in the training model is in the attribution feature vector.

As shown in this example, for a given individual (identified by their customer identifier), an attribution feature vector is generated for the pair of the individual and the piece of feedback item. In this case, it is known whether or not that individual left the piece of feedback, and the attribution is labeled accordingly.

In this example, training is performed by fitting a logistic regression to the training data, which provides weights for each factor of the machine learning model.

In some embodiments, there are different machine learning models per industry (e.g., because the auto industry has certain attributes, such as parts advisors, that the healthcare industry does not). In some embodiments, models may be individually tuned for specific sources or sets of sources. In some embodiments, different machine learning models are used, with different tuning. For example, different models may be used that are tuned uniquely to certain review sites. In other embodiments, the same model is used with the same industry. The model may include or be extended to include attributes that are different on different source sites. For example, if a source site only provides a first name and a last initial, then in some embodiments, the model is included with factor(s) that take into account the last initial (e.g., by adding variables of "last initial match" and "last initial mismatch").

While the model may be trained for different source sites, with different parameters and attributes, there may be a tradeoff, as tuning for a particular source site limits the volume of relevant training data (as it may be limited to feedback from that source site for which the model is being uniquely tuned). In some embodiments, rather than having different tuned models for different source sites, a same model is used that incorporates attributes of various source sites, allowing for a larger volume of training data to be used. In some embodiments, ensembles of models are used.

ILLUSTRATIVE EXAMPLES OF PROBABILISTIC FEEDBACK ATTRIBUTION

The following are illustrative examples of AutoBest utilizing the probabilistic feedback attribution processing provided by reputation platform 102.

First Example

In this example, suppose that a review was left online on a review site on 2/11/20 by Bob Smith relating to AutoBest West—"Love AutoBest West, love my new Courser. Joe was super helpful."

In this example, reputation platform 102 collects the review from the source site (e.g., using feedback collector 218). The platform performs feedback attribution on the review (e.g., using feedback attribution engine 224) by extracting various features of the review, such as:
  Reviewer
  Date
  Source
  Verbatim
  Other data either provided or pulled from review Vehicle
  People interacted with
  Actions
    Test drive, phone call, online inquiry, . . .
  In this example, based on the features of the review, a set of individuals to which the review is to be probabilistically mapped is determined. For example, the set of individuals to be evaluated includes those that had an interaction with AutoBest West (as specified in the review, or because the review was left on the page of a location corresponding to AutoBest) within a time frame/period around the time that the review was left (e.g., a time period that includes a period before and a period subsequent to the date that the review was left).

In this example, suppose that the attribution processing filters or limits the set of individuals to anyone who has had an engagement with the AutoBest West location in the last year.

In this example, suppose that multiple individuals (who, for example, have records in individual records data store 212) are determined to match the filtering criteria based on the characteristics of the review. In this example, suppose that one of the individuals in data store 212 is Robert Smith, who according to their record on reputation platform 102 (which includes, for example, information collected from AutoBest's CRM), has purchased a 2020 Courser on Feb. 6, 1920 from Sales agent Joseph James at AutoBest West. An example of Robert Smith's record is shown below.
  Customer
    Customer id: 1234
    name—Robert Smith
    vehicle—2020 Courser
      Purchase date—2/6/20
      Service dates—vector
      Other interaction dates and parties
      Sold by—Joseph James
      Finance—XXX
      Service Advisor
    Survey history—collection of surveys
      When requested
      Did he open
      Did he complete
        All results and verbatims
  Transaction
    Sales/Service/Parts/Inquiry
    Date
    Served by
    Details related to transaction
      Vehicle bought—year/make/model
      Date
      Related events—e.g., test drive, online inquiry, etc.
    And their related details
      Price
      VIN
      Sales agent
      Finance liaison
      . . .

In this example, a feature vector for the feedback item is generated. The information included in the feedback feature vector includes various characteristics of the review. On the other side, feature vectors for each of the individuals are also generated. In some embodiments, a data store of individual records (e.g., data store 212) returns, for each individual that satisfies the filtering/selection criteria, a vector of information associated with the user. In the case of Robert Smith, his individual feature vector includes, for example, his most recent sales experience prior to the date of the specific review, the service advisor's name, his vehicle make, his vehicle model, etc.

The feedback item feature vector and the individuals' respective feature vectors are combined to generate an input to a feedback attribution model, where the input includes a data structure such as a matrix or table that includes multiple attribution feature vectors, where each attribution vector corresponds to a particular pairing of the feedback item and a specific individual. For example, one of the attribution feature vectors corresponds to the pair of the review and Robert Smith customer (whose record has a specific, unique customer identifier in the data warehouse 212).

As described above, in some embodiments, generating the attribution model input feature vector for a pair of the review and an individual includes determining whether there is a match/mismatch on certain attributes (e.g., first name, nickname, vehicle, etc.) between the feedback item and the individual.

The following is an example of an input attribution feature vector based on the specific pairing of the review and Robert Smith. As shown in this example, the matching of characteristics is encoded such that binary values (e.g., 0 or 1 in this example) are provided for each factor. While binary values are shown in the examples described herein for illustrative purposes, as described above other types of values may be used for this and other type of models used to perform feedback attribution.

> First name match—0
> First name mismatch—0
> First name match—nickname—1
> Last name match—1
> Last name mismatch—0
> Vehicle make match—1
> Vehicle make mismatch—0
> Vehicle model match—1
> Vehicle model mismatch—0
> Location name match—1
> Location name mismatch—0
> Review within 3 days—0
> Review within 7 days—1
> Review within 30 days—0
> Sales experience match—1
> Sales experience mismatch—0
> Service experience match—0
> Service experience mismatch—0
> Agent first name match—1
> Agent first name mismatch—0
> Agent last name match—0
> Agent last name mismatch—0
> . . .

As shown in this example, the attribution feature vector for the pair of the review and Robert Smith includes factors that include the possible outcomes of matching on certain attributes such that the matching can be encoded in a binary format. For example, with respect to the "first name" attribute, possible outcomes of matching the name from the review and the name obtained from the CRM system have been broken out as individual factors or components in the input attribution feature vector that may be encoded as 0 or 1 (or True/False). In this example, with respect to the "first name" attribute, the name "Bob" from the review and the name "Robert" from the CRM are not a match, and thus the value for whether there is a first name match is 0. However, Bob is a nickname or shortened version of Robert, and thus the factor corresponding to "first name match—nickname" is true, and set to 1. The factor corresponding to a mismatch between the feedback attribute value and the CRM attribute value is set to 0, because there was not a mismatch (since the first name attribute values did match from a nickname perspective).

In this example, where this is not sufficient information to make a determination of match/mismatch, the values for both the match and mismatch factors are set to 0 (see, for example, the agent last name match/mismatch factor, where there was not sufficient information to determine the agent's last name from the review since that information was not present in the review). As another example, if the review mentioned that a car of a first make was purchased, but the CRM transaction data indicates a different make, then the factor corresponding to a match on the attribute "vehicle make" may be set to 0, while the factor corresponding to a mismatch on the attribute "vehicle make" may be set to 1. If there is no mention of the make, or there is insufficient information to perform matching, then both match/mismatch factors are set to 0. In some embodiments, the baseline for the attribution model is that all factor values are 0. In this way, in some embodiments, in a model such as a regression model, any of the match variables will have a positive coefficient that increases the probability of attribution, while mismatch variables will have a negative impact on the probability (where the impact need not be symmetric between match/mismatch). This provides the model flexibility to understand what it is learning, and how to extend the model.

In this example, the table of attribution feature vectors is provided as input to a probabilistic feedback attribution model (e.g., model 228). In this example, suppose that the algorithm assigns a very high confidence (e.g., 99%) that the Robert Smith above, that is known to platform 102 from the CRM data, has left the review, with a near zero probability for all other evaluated individuals.

In this example, being able to tie the review (which came from a source or via a path different from the interaction data from the entity) to individuals provides various benefits. For example, by knowing that the author of the review left on a review site is the Robert Smith that AutoBest has previously interacted with and has a record of in their CRM, the AutoBest West dealership location may then bring in further information to improve the customer experience. For example, AutoBest West can access their records for Robert Smith to further review historical information such as the history of service advisors, which would then allow Auto-Best, for example, to aggregate additional information to determine how satisfied their customers are with certain service advisors or sales agents. This is in contrast to the case where an individual explicitly mentioned a sales agent or where an individual responded to a certain sort of review about a sales agent.

Second Example

In this example, suppose that a review was left on an online review site on 2/21/20 by Maggie Smith on a page relating again to AutoBest West—"Love AutoBest West. Joe was super helpful."

In this example, suppose that based on the filtering criteria of location (AutoBest West) and time (within 30 days before to 10 days after), Robert Smith is again identified in a group of individuals from data store 212 of reputation platform 102.

In this example, the attribution feature vector generated for the pair of the review and Robert Smith's record is as follows:

First name match—0
First name mismatch—1
First name match—nickname—0
Last name match—1
Last name mismatch—0
Vehicle make match—0
Vehicle make mismatch—0
Vehicle model match—0
Vehicle model mismatch—0
Location name match—0
Location name mismatch—0
Review within 3 days—0
Review within 7 days—0
Review within 30 days—1
Sales experience match—0
Sales experience mismatch—0
Service experience match—0
Service experience mismatch—0
Agent first name match—1
Agent first name mismatch—0
Agent last name match—0
Agent last name mismatch—0
. . .

As shown in the above example attribution feature vector, the components of first name mismatch, last name match, review within 30 days, and agent first name match are set to 1, while all other values are set to 0.

In this example, there is some conflicting information related to this match between the review and Robert Smith's record, where some factors match, but other factors such as first name do not. Suppose that for the AutoBest West location, there is another individual identified in data store 212 that has the last name Smith (Linda Smith in this example), who most recently visited the store on 8/11/19, but has never engaged directly with any employee named Joe (to the knowledge of platform 102 in this example, where there is no such transaction event recorded in Linda Smith's record).

In this example, suppose that the feedback attribution machine learning model assigns a 50% probability that this review relates or can be attributed to Robert Smith, a 20% probability that it relates to Linda Smith, and a 10% probability distributed across all other evaluated individuals. This leaves a 20% probability that the review was related to no known individual (that is known to the platform or AutoBest's CRM).

In contrast to the first example above, where there was a high confidence of a match to a person known to platform 102, in this second example, there is a distribution of probabilities assigned across a number of individuals, where it is not decided whether or not there is a definitive match to one person or another. As described above, various processing may be performed based on the percentage likelihoods determined based on the feedback attribution processing described herein. For example, AutoBest is notified of the different individuals and their probability of having left the review. AutoBest may then perform further processing based on this probabilistic knowledge.

Third Example

As described above, in some embodiments, probabilistic feedback attribution is re-performed. In this example, individuals' historical data is leveraged, even across multiple locations.

In this example, suppose that Jerry Davis leaves a review for AutoBest West on Mar. 1, 1920—"Went to AutoBest West looking to buy a Courser. Salespeople are so RUDE. Will never go back."

In this example, suppose that in a first pass of probabilistic attribution, the Jerry Davis of the review did not match anyone in platform 102's individuals' records data warehouse, and there is a low match probability to any known AutoBest customer.

Now suppose that at a later date, platform 102 collects a transaction event from the AutoBest's external CRM application, where on 3/15/20 a Jerry Davis buys a Courser at a different AutoBest dealership—AutoBest South. Here, suppose that this is a new individual from the perspective of platform 102 (in that platform 102 did not previously have a record for a Jerry Davis since it had not seen a transaction event for this individual from the CRM system), and a new record is generated for Jerry Davis in the individual records data store 212 on reputation platform 102.

In this example, in response to identification of a new individual in the data warehouse related to a tenant (AutoBest in this example), probabilistic feedback attribution is performed or re-performed on various feedback items, such as those that were not attributed to anyone (which may be indicated via a flag in the record of the feedback item on platform 102), including the review in this example.

In this example, the review is evaluated again, with the new Jerry Davis record being identified as being a candidate (where, for example, the selection criteria for individuals is broadened to include individuals with transactions at other AutoBest locations—that is, in this example, the selection criteria for this second pass of feedback attribution processing performed on the review is different from the first time the feedback attribution processing was performed on the same review). In this example, by re-performing feedback attribution processing, feedback attribution engine 224 determines, with a high probability, that the Jerry Davis in platform 102's records is likely the person who left the review.

In the above example, re-processing of the review was based on identification of a new individual across all AutoBest locations, which triggered re-evaluation of some or all reviews. In some embodiments, all (or a subset of) feedback is reviewed on a periodic basis (e.g., every day, week, month, etc.).

Thus, as shown in the examples above, by using the feedback attribution techniques described herein, AutoBest is able to determine, probabilistically, who, in the various people that AutoBest has interacted with, left a piece of feedback.

FIG. 4 is a flow diagram illustrating an embodiment of a process for feedback attribution. In some embodiments, process 400 is executed by feedback attribution engine 224 of platform 102. Process 400 may be performed in real-time as part of ingestion processing of the feedback item, or may also be evaluated as part of a batch process (e.g., run periodically on a daily basis, weekly, monthly, when new information is updated in a CRM system, etc.). Process 400 begins at 402, when a feedback item pertaining to an entity is received. In some embodiments, as described above, the feedback item is collected from a source site. Examples of feedback data items include reviews, surveys, listings, social comments, search results, etc.

At 404, information pertaining to one or more candidate sources of the feedback item is received. The candidate sources may include potential origins/originators of the feedback item, which may include individuals or other entities.

In some embodiments, the information pertaining to the one or more candidate sources includes information pertaining to one or more individuals that are potential sources of the feedback item, and may include information associated with interaction events involving the one or more individuals and the entity. In some embodiments, as described above, the information pertaining to an interaction event includes information about an interaction or engagement that an individual had with an entity. In some embodiments, the interaction information is collected or received from an application such as a CRM system.

In some embodiments, the one or more candidate sources that are evaluated as potential sources of the feedback item are identified or otherwise selected based on characteristics of the feedback item. For example, candidate sources such as individuals may be identified based on a location (of the entity) pertaining to the feedback item, a time period based on a time that the feedback item was left, an interaction type, etc.

At 406, a probabilistic mapping of the feedback item to the one or more candidate sources is determined. In some embodiments determining the probabilistic mapping includes assessing the probabilities that the feedback item is attributed to the candidate sources or the likelihoods that the candidate sources are the source of the feedback item.

In various embodiments, as described above, determining the probabilistic mapping includes the following example steps. Features of the feedback item are extracted. For each candidate source, features of information pertaining to a given candidate source are extracted. In some embodiments, this includes determining features from interaction events that occurred between the candidate source (e.g., individual) and the entity (or a location of the entity).

In some embodiments, for each pair of the feedback item and a given candidate source in the identified candidate sources, an attribution feature vector is determined based on the feedback item features, the features associated with the given candidate source based on their interaction event(s), or both.

In some embodiments, the attribution feature vectors determined for the identified candidate sources are provided together as input to a feedback attribution model. In some embodiments, the model is a machine learning model. One example of such a model is a multinomial linear regression model. Other types of models may be used. In some embodiments, the model includes a variety of factors. In some embodiments, the factors or components indicate different types of matches between features from the candidate source-side and the feedback-side. The matches may be indicated in various ways, such as Boolean values (e.g., True or False or 1 and 0), or with similarity scores with thresholds to determine how closely the values for a feature/factor match between candidate source-side and feedback-side data. Other data may also be included in the feature vector, such as a score for how rare specific values for features are (e.g., how rare specific names or models of vehicles are), which may be used to improve the accuracy of the feedback attribution processing.

In some embodiments, the entity is associated with a particular industry, and the feedback attribution model that is used is tuned for the particular industry, where different industries are associated with different models. Various examples and details of training such a model are described above.

In some embodiments, the model provides as output a probability distribution vector, where the probability distribution vector includes, for each candidate source in the identified candidate sources, the probability that the feedback item is attributed to a given candidate source (e.g., the measure of likelihood or confidence that the given candidate source is the source or origin of the feedback item). This includes determining, for example, the probability that an individual authored or left the feedback item. Various examples of processing based on the output probability distribution vector are described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  one or more processors configured to:
    determine training data usable to train a feedback attribution model at least in part by generating a piece of feedback that is known to be attributed to a particular individual at least in part by:
      responsive to an interaction involving the particular individual, transmitting a review request to the particular individual, wherein the interaction involving the particular individual is recorded in an external application, and wherein the particular individual is identified via the external application; and
      responsive to clicking of a link included in the review request, posting the piece of feedback on behalf of the particular individual;
    train the feedback attribution model using the generated piece of feedback that is known to be attributed to the particular individual and that was posted on behalf of the particular individual responsive to clicking of the link included in the review request transmitted to the particular individual responsive to the interaction involving the particular individual;
    collect, over a network and from a source site, a feedback item pertaining to an entity, wherein the collecting comprises using a web scraper to scrape the source site for the feedback item based at least in part on a determination that querying of the source site using an Application Programming Interface (API) is unavailable for the source site, and wherein the collecting of the feedback item is facilitated at least in part by a load distribution proxy that distributes load for scraping for feedback;
    receive information pertaining to a plurality of candidate sources of the feedback item, wherein the information pertaining to the plurality of candidate sources is extracted from the external application and stored in records corresponding to the plurality of candidate sources;
    determine a probabilistic mapping between the feedback item and the plurality of candidate sources of the feedback item, wherein determining the probabilistic mapping comprises:
      generating a plurality of attribution feature vectors based at least in part on an evaluation of the feedback item collected using the web scraper and the received information pertaining to the plurality of candidate sources that is extracted from the external application;

providing the plurality of attribution feature vectors as input to the feedback attribution model trained using the generated piece of feedback that is known to be attributed to the particular individual and that was posted on behalf of the particular individual responsive to clicking of the link included in the review request transmitted to the particular individual responsive to the interaction involving the particular individual; and generating, at least in part by the feedback attribution model, a probability distribution vector comprising a plurality of probabilities, wherein each probability comprises a probability that a given candidate source in the plurality of candidate sources left the feedback item;

determine, at least in part by summing the plurality of probabilities in the probability distribution vector generated at least in part by the feedback attribution model, a measure of likelihood that none of the candidate sources in the plurality of candidate sources left the feedback item; and perform an action based at least in part on the measure of likelihood that none of the candidate sources in the plurality of candidate sources left the feedback item, wherein performing the action comprises providing an alert indicating a potential presence of a fake feedback item based at least in part on the measure of likelihood that none of the candidate sources in the plurality of candidate sources left the feedback item exceeding a threshold; and a memory coupled to the one or more processors and configured to provide the one or more processors with instructions.

2. The system recited in claim 1, wherein the plurality of candidate sources is selected based at least in part on a set of characteristics of the feedback item.

3. The system recited in claim 2, wherein the set of characteristics of the feedback item used to select the plurality of candidate sources comprises at least one of a location of the entity to which the feedback item is directed and a time that the feedback item was left.

4. The system recited in claim 1, wherein the plurality of candidate sources of the feedback item comprises a plurality of individuals, wherein the information pertaining to the plurality of candidate sources comprises information pertaining to the plurality of individuals, and wherein the information pertaining to the plurality of individuals comprises information associated with interaction events between the plurality of individuals and the entity.

5. The system recited in claim 4, wherein the one or more processors are configured to collect the information associated with the interaction events from a Customer Relationship Management (CRM) system.

6. The system recited in claim 1, wherein determining an attribution feature vector comprises:

determining a feedback feature vector comprising a set of features of the feedback item;

based at least in part on information pertaining to a candidate source in the plurality of candidate sources, determining, for the candidate source, a corresponding candidate source feature vector comprising features associated with the candidate source; and based at least in part on the feedback feature vector, the candidate source feature vector, or both, determining the attribution feature vector.

7. The system recited in claim 1, wherein the feedback item comprises one of a review, a survey, a listing, a social comment, and a search result.

8. A method, comprising:

determining training data usable to train a feedback attribution model at least in part by generating a piece of feedback that is known to be attributed to a particular individual at least in part by:

responsive to an interaction involving the particular individual, transmitting a review request to the particular individual, wherein the interaction involving the particular individual is recorded in an external application, and wherein the particular individual is identified via the external application; and responsive to clicking of a link included in the review request, posting the piece of feedback on behalf of the particular individual:

training the feedback attribution model using the generated piece of feedback that is known to be attributed to the particular individual and that was posted on behalf of the particular individual responsive to clicking of the link included in the review request transmitted to the particular individual responsive to the interaction involving the particular individual:

collecting, over a network and from a source site, a feedback item pertaining to an entity, wherein the collecting comprises using a web scraper to scrape the source site for the feedback item based at least in part on a determination that querying of the source site using an Application Programming Interface (API) is unavailable for the source site, and wherein the collecting of the feedback item is facilitated at least in part by a load distribution proxy that distributes load for scraping for feedback;

receiving information pertaining to a plurality of candidate sources of the feedback item, wherein the information pertaining to the plurality of candidate sources is extracted from the external application and stored in records corresponding to the plurality of candidate sources;

determining a probabilistic mapping between the feedback item and the plurality of candidate sources of the feedback item, wherein determining the probabilistic mapping comprises:

generating a plurality of attribution feature vectors based at least in part on an evaluation of the feedback item collected using the web scraper and the received information pertaining to the plurality of candidate sources that is extracted from the external application;

providing the plurality of attribution feature vectors as input to the feedback attribution model trained using the generated piece of feedback that is known to be attributed to the particular individual and that was posted on behalf of the particular individual responsive to clicking of the link included in the review request transmitted to the particular individual responsive to the interaction involving the particular individual; and generating, at least in part by the feedback attribution model, a probability distribution vector comprising a plurality of probabilities, wherein each probability comprises a probability that a given candidate source in the plurality of candidate sources left the feedback item;

determining, at least in part by summing the plurality of probabilities in the probability distribution vector generated at least in part by the feedback attribution model, a measure of likelihood that none of the candidate sources in the plurality of candidate sources left the feedback item; and performing an action based at least in part on the measure of likelihood that none of the candidate sources in the plurality of candidate sources left the feedback item, wherein performing the action comprises providing an alert indicating a potential presence of a fake feedback item based at least in part on the measure of likelihood that none of the candidate sources in the plurality of candidate sources left the feedback item exceeding a threshold.

9. The method of claim 8, wherein the plurality of candidate sources is selected based at least in part on a set of characteristics of the feedback item.

10. The method of claim 9, wherein the set of characteristics of the feedback item used to select the plurality of candidate sources comprises at least one of a location of the entity to which the feedback item is directed and a time that the feedback item was left.

11. The method of claim 8, wherein the plurality of candidate sources of the feedback item comprises a plurality of individuals, wherein the information pertaining to the plurality of candidate sources comprises information pertaining to the plurality of individuals, and wherein the information pertaining to the plurality of individuals comprises information associated with interaction events between the plurality of individuals and the entity.

12. The method of claim 11, comprising collecting the information associated with the interaction events from a Customer Relationship Management (CRM) system.

13. The method of claim 8, wherein determining an attribution feature vector comprises:

determining a feedback feature vector comprising a set of features of the feedback item;

based at least in part on information pertaining to a candidate source in the plurality of candidate sources, determining, for the candidate source, a corresponding candidate source feature vector comprising features associated with the candidate source; and based at least in part on the feedback feature vector, the candidate source feature vector, or both, determining the attribution feature vector.

14. The method of claim 8, wherein the feedback item comprises one of a review, a survey, a listing, a social comment, and a search result.

15. A computer program product embodied in a non-transitory computer readable medium and comprising computer instructions for:

determining training data usable to train a feedback attribution model at least in part by generating a piece of feedback that is known to be attributed to a particular individual at least in part by:

responsive to an interaction involving the particular individual, transmitting a review request to the particular individual, wherein the interaction involving the particular individual is recorded in an external application, and wherein the particular individual is identified via the external application; and responsive to clicking of a link included in the review request, posting the piece of feedback on behalf of the particular individual;

training the feedback attribution model using the generated piece of feedback that is known to be attributed to the particular individual and that was posted on behalf of the particular individual responsive to clicking of the link included in the review request transmitted to the particular individual responsive to the interaction involving the particular individual;

collecting, over a network and from a source site, a feedback item pertaining to an entity, wherein the collecting comprises using a web scraper to scrape the source site for the feedback item based at least in part on a determination that querying of the source site using an Application Programming Interface (API) is unavailable for the source site, and wherein the collecting of the feedback item is facilitated at least in part by a load distribution proxy that distributes load for scraping for feedback;

receiving information pertaining to a plurality of candidate sources of the feedback item, wherein the information pertaining to the plurality of candidate sources is extracted from the external application and stored in records corresponding to the plurality of candidate sources;

determining a probabilistic mapping between the feedback item and the plurality of candidate sources of the feedback item, wherein determining the probabilistic mapping comprises:

generating a plurality of attribution feature vectors based at least in part on an evaluation of the feedback item collected using the web scraper and the received information pertaining to the plurality of candidate sources that is extracted from the external application;

providing the plurality of attribution feature vectors as input to the feedback attribution model trained using the generated piece of feedback that is known to be attributed to the particular individual and that was posted on behalf of the particular individual responsive to clicking of the link included in the review request transmitted to the particular individual responsive to the interaction involving the particular individual; and generating, at least in part by the feedback attribution model, a probability distribution vector comprising a plurality of probabilities, wherein each probability comprises a probability that a given candidate source in the plurality of candidate sources left the feedback item;

determining, at least in part by summing the plurality of probabilities in the probability distribution vector generated at least in part by the feedback attribution model, a measure of likelihood that none of the candidate sources in the plurality of candidate sources left the feedback item; and performing an action based at least in part on the measure of likelihood that none of the candidate sources in the plurality of candidate sources left the feedback item, wherein performing the action comprises providing an alert indicating a potential presence of a fake feedback item based at least in part on the measure of likelihood that none of the candidate sources in the plurality of candidate sources left the feedback item exceeding a threshold.

* * * * *